Patented July 26, 1927.

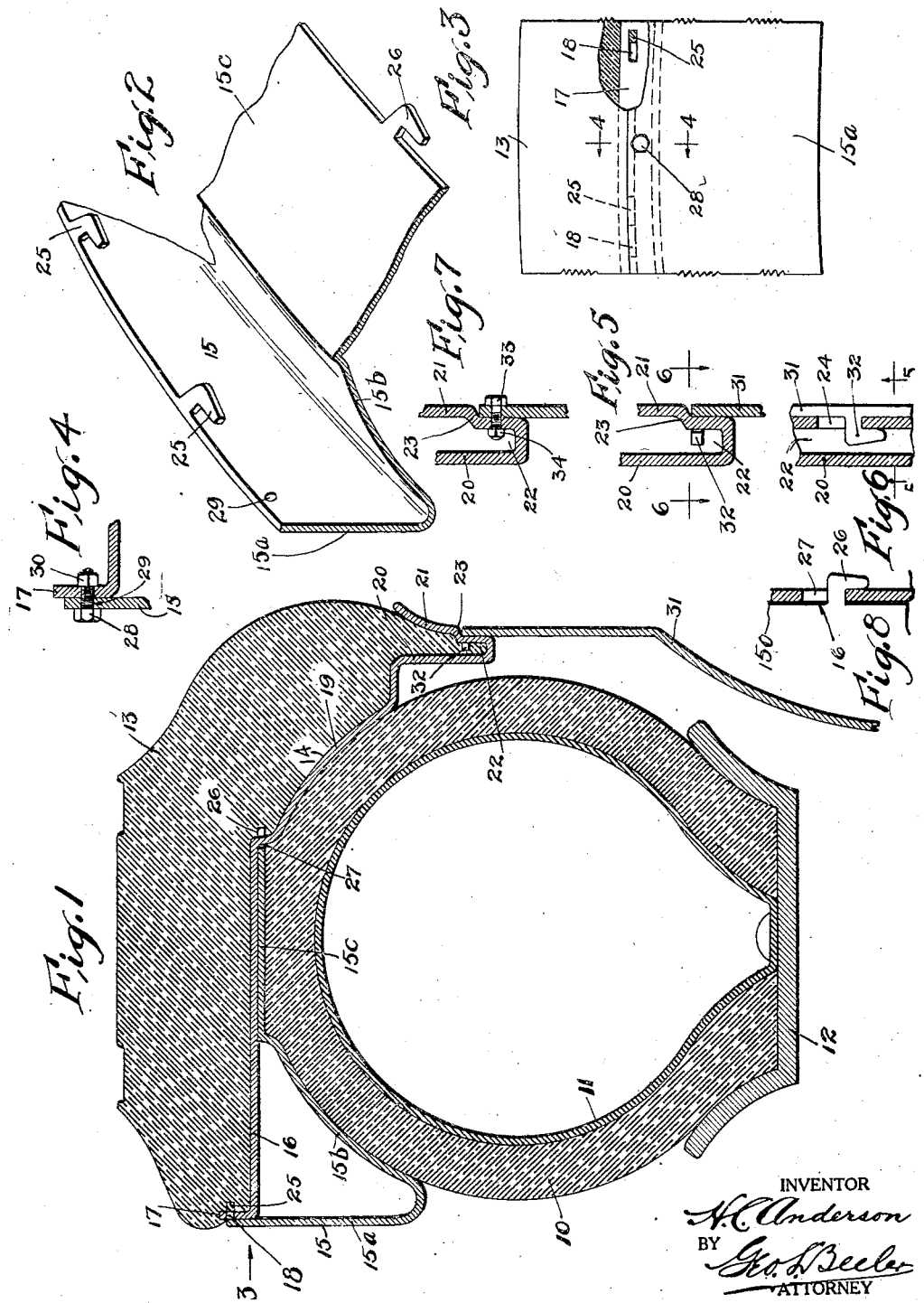

1,636,948

UNITED STATES PATENT OFFICE.

HIRAM C. ANDERSON, OF NEW YORK, N. Y.

TIRE PROTECTOR.

Application filed December 3, 1924. Serial No. 753,644.

This invention relates to resilient tires and wheels and has particular reference to vehicle wheels having pneumatic tires.

Among the objects of the invention is to provide practical and easily manipulated or controlled means for so protecting a pneumatic tire or shoe as to render it not only puncture-proof at the tread, but practically impregnable from such conditions as tend to break or otherwise damage such tire or shoe from the outside.

More specifically, the protector constituting the subject of this specification is so designed and constructed as to embrace all of the tread portion of a pneumatic tire which may be of any usual or conventional type or construction, as to protect it from punctures, denting or breaking strains, tending to rupture the cord or other fibrous carcass within it, and consequently serving to prevent any likelihood or even possibility of a blow-out, it being remembered that blow-outs are more liable to occur as a result of breakage of the carcass from external force than from internal pressure.

A still further object of the invention is to permit pneumatic tires and wheels to be operated at a materially lower inflation pressure than usual, with the result that the easy riding qualities will be markedly increased and yet without increasing the steering traction or friction that is noticeably incident to the operation of an ordinary pneumatic tire with under inflation.

With the foregoing and other objects of the invention in view the invention consists in the arrangement and combination of parts hereinafter described and claimed, and while the invention is not restricted to the exact details of construction disclosed or suggested herein, still for the purpose of illustrating a practical embodiment thereof, reference is had to the accompanying drawings in which like reference characters designate the same parts in the several views, and in which—

Figure 1 is a vertical transverse section of a preferred embodiment of my invention applied to a conventional wheel rim and tire.

Fig. 2 is a fragmentary perspective view of the auxiliary tread rim section.

Fig. 3 is a fragmentary side elevation as from the arrow 3 of Fig. 1 and with parts broken away and in section.

Fig. 4 is a sectional detail on the line 4—4 of Fig. 3.

Fig. 5 is a vertical sectional detail on the line 5—5 of Fig. 6.

Fig. 6 is a horizontal section on the line 6—6 of Fig. 5.

Fig. 7 is a view similar to Fig. 5 but in a plane to disclose the locking means for the outer disk.

Fig. 8 is a detail of the joint between the two rim sections.

Referring now more specifically to the drawings, I show a conventional or any suitable pneumatic shoe 10 having an inner tube 11 and supported by or upon a rim 12. These parts are referred to for the purpose of laying a basis for the improvement which is so designed as to be applied to practically any standard or conventional wheel or shoe, whether of wire, artillery, disk, or other structural design.

13 indicates a tread member, preferably of molded cushioning composition, made or molded as an integral fixture upon a tread rim structure, such as the part 14, an auxiliary rim part 15 being provided, said parts having detachable interlocking relation to each other and so shaped in cross sectional design as to embrace all the tread portion of the shoe 10 and so be practically self retaining thereupon.

The tread rim 14 is formed preferably from sheet metal and of such shape and other structural considerations as to be of complete annular form and practically rigid, thereby serving to maintain the tread cushion 13 in substantially annular form. The rim 14 comprises a portion 16 straight or flat in cross section or cylindrical circumferentially and from which extends an outward flange 17 provided with an annular series of slots 18 spaced uniformly outward from the cylindrical portion 16 and from one another. The flat portion 16 extends laterally beyond the central plane of the wheel and thence the tread rim is bent inward toward the axis of the wheel where it is so curved or shaped at 19 as to conform to the curvature of the shoe embraced thereby. Beyond this curved portion 19 is provided a trough-like or double flange structure having inner and outer parts 20 and 21, the latter having a slight outer flare or curvature simulating the most nearly analogous feature of standard tire structures. This double flange structure forms an effective seat for receiving and holding the outer edge portion of the cushion 13. Near the bottom of the channel 22 formed between these two flange portions 20 and 21, the outer flange 21 is provided with a shoulder or offset 23 within which, considered toward the axis of the wheel, are formed a circumferential series of slots 24, these slots, like the slots 18, being spaced equally from the axis of the wheel and from one another around the wheel.

The auxiliary section 15 of the tread rim structure is formed preferably from sheet metal and comprises three annular parts $15^a$, $15^b$, and $15^c$ integral with one another. The part $15^a$ is practically flat and lies in a plane perpendicular to the axis of the wheel. The part $15^c$ is flat in cross section or cylindrical circumferentially and lies snugly against a portion of the rim part 16, and the other auxiliary rim part $15^b$ is curved, corresponding to the part 19 of the first mentioned rim and so hugs laterally the inner portion of the tread of the shoe 10. Formed integral with and extending laterally from the periphery of the flange $15^a$ are a plurality of hooks 25 all lying in the same circle and having their points projecting in the same direction. These hooks coooperate with the slots 18 above described. On the remote or free outer edge of the portion $15^c$ of the auxiliary rim are formed a series of hooks 26 which co-operate with a similarly arranged series of slots 27 formed at the shoulder between the parts 16 and 19 of the main section of the rim. The points of the hooks 26 project circumferentially in the same direction as the hooks 25. In assembling these parts of the rim the auxiliary section being in place the other is shoved directly toward and over it, the flat portion 16 of the main section gliding without material resistance over the part $15^c$, bringing the hooks 25 and 26 into and through the respective slots 18 and 27. The two rim sections are then given a relative rotation sufficient to interlock the points of the two sets of hooks behind the unslotted portions of the members in which the slots are formed. This makes a strong easily assembled and disassembled interlock for these two rim sections. Unintended or accidental loosening or reverse rotation of these parts is prevented by any suitable locking means such as a screw 28 driven through a hole 29 in the flange $15^a$ and into a nut 30 secured as by spot welding on the remote surface of the flange 17. This rim structure is exceedingly strong and safe and is reinforced or double at the central portion of the tread of the center wheel or shoe. It will be seen to comprise an auxiliary rim member 15 which in conjunction with the flange 16 forms in cross section a right triangle, an arm $15^a$ of the triangle being perpendicular to the cylindrical flange 16, while the hypothenuse $15^b$ of the triangle lies in abutment with said tire at a side thereof to afford lateral bracing at said tire, said hypothenuse extending into engagement with the outer rim member 14 as by means of the portion $15^c$.

Agreeable to the modern disk wheel practice I show at 31 an outer disk, the periphery of which is provided with a circumferential series of hooks 32 adapted to pass laterally through the slots 24 and interlock within the channel 22 as a result of a slight relative rotation between the disk and the tread mechanism above described. Accidental or undesired unlocking of these parts is prevented by any suitable key or other locking means such as a screw 33 located at any convenient place between two adjacent slots 24 and driven into a nut 34 secured as by welding within said channel 22.

With the parts constructed and assembled with respect to one another and the standard wheel as above set forth, the mode of operation or advantages will be readily understood from the following brief summary: The tread member or protector being relatively rigid and so adapted to maintain its circular form under all conditions of usage, sustains not only the running or wearing traction on the roadway, but also the shocks, blows, or the like incident to cobble stones, curbs, railway rails, or other analogous obstructions that are certain to be met with and which are so extremely likely to cut the usual shoe or rupture the inner carcass thereof. Furthermore, since the tread structure or protector maintains its substantially circular form, the pressure or blow that would ordinarily dent and possibly damage the shoe 10 is distributed well along and around that arc of the protector adjacent to but extending from both sides of the point of impact. From this fact it follows that the inner shoe 10 is relieved from cutting or rupturing blows and from which it follows also that the inflation pressure for the inner tube need not be maintained at more than one-half above that usually required. If desired a cheaper and even smaller shoe 10 may be provided and used with my improvement. The disk 31 when attached as shown becomes a fixture with the protector and they together have a floating action relatively to the inner wheel and axle. Access may be had readily to the hub or any other portion of the wheel by simply removing the screw 33 and giving the disk a slight rotation to unlock its hooks 32 from the rim structure, without removing or disturbing said rim structure. This may be done also for the purpose of inflating the inner tube from time to time if it is not accessible from the inner side of the wheel. This device, furthermore, may be employed as an emergency tread structure and may be applied with facility to standard wheel structures already in use. The auxiliary section 15 of the rim is adapted to be passed over the shoe when deflated or the shoe may be removed with the rim 12 for this purpose. After the auxiliary rim is thus placed between the shoe and the vehicle, the tread and main rim portions are slipped into place and the interlock effected as above described at the hooks 25 and 26. When the inner tube and shoe are suitably inflated the grip between the shoe and the tread structure is ample for all practical and traction purposes.

I claim:

1. In a tire protector, a main tread rim of annular form and adapted to embrace a portion of a pneumatic tire, said rim having flanged structures along its parallel edges, one of said flanges being provided with circumferentially arranged slots, and said rim being slotted circumferentially intermediate of its edges, an auxiliary rim member of channel construction adapted to embrace that portion of the tread and the wheel opposite the portion embraced by the first mentioned rim member, said auxiliary rim having a plurality of hooks extending in the same direction and adapted for simultaneous interlocking engagement in and through said slots, and a cushion member carried upon the first mentioned rim and co-operating with the flanges thereof.

2. In a tire protector, a main tread rim of annular form adapted to embrace a portion of a pneumatic tire, said rim comprising an outer rim member having direct engagement with outer cushioning means and arranged to support the same, and an auxiliary member co-operating with said outer rim member and whereby said rim is retained in engagement with the pneumatic tire, said outer rim member comprising a pair of annular flanges at an angle to each other, one of said flanges having an element parallel to the axis of the pneumatic tire whereby said flange can be slipped over the same laterally and whereby the other flange is brought into abutment with said tire at a side thereof, said auxiliary member comprising a pair of flanges one of which is arranged to bear upon said tire at the opposite side thereof, said flange having means at the outer periphery thereof for engaging said outer rim member adjacent to the central plane of the tire to retain said flange in abutment with said tire as stated, while the other flange extends outwardly from the inner periphery of its co-operating flange and into engagement with said outer rim member at a side of the cushioning means to afford support for the cushioning means adjacent thereto.

3. The combination as in claim 2 wherein said outer rim member comprises an offset portion between its flanges, said auxiliary rim member comprising a portion at said outer periphery which extends between said tire and said outer rim member and into engagement with said offset portion in a direction parallel to the axis of the tire.

4. In a tire construction, the combination with a pneumatic tire, of an outer wheel structure supported thereby comprising a rim structure and cushioning means carried thereby, said rim structure comprising an outer rim member having a pair of annular flanges one of which is arranged to abut against a side of said tire when the other flange is slipped axially thereover, and an auxiliary rim member comprising a pair of annular flanges and forming in conjunction with said outer rim member a substantially triangular section to act as a supporting abutment in co-operation with the outer rim member for said tire at the opposite side thereof and adjacent to the central plane of the tire.

5. The combination as in claim 4 wherein the second mentioned flange of the outer rim member is of substantially cylindrical formation to pass readily over the tire, said auxiliary rim member forming in conjunction with said outer rim member a substantially right triangular section, the hypothenuse whereof lies in contact with said tire and comprises a portion extending between said tire and the outer rim member and engaging the same at the junction of the flanges of said outer rim member.

In testimony whereof I affix my signature.

HIRAM C. ANDERSON.